Jan. 19, 1926.

L. C. SCHNEIDER

TRAP

Filed Dec. 23, 1921

1,570,578

2 Sheets-Sheet 1

INVENTOR
Leopold C. Schneider.

WITNESS
F. J. Hartman.

ATTORNEYS

Jan. 19, 1926.  
L. C. SCHNEIDER  
1,570,578  
TRAP  
Filed Dec. 23, 1921   2 Sheets-Sheet 2
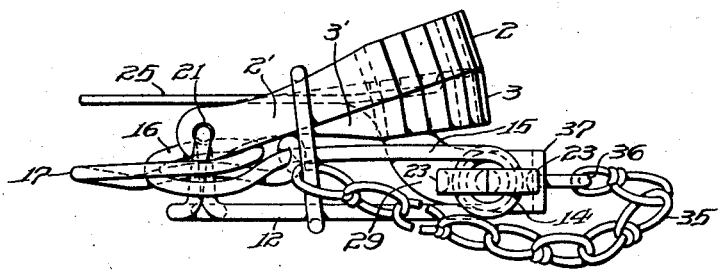
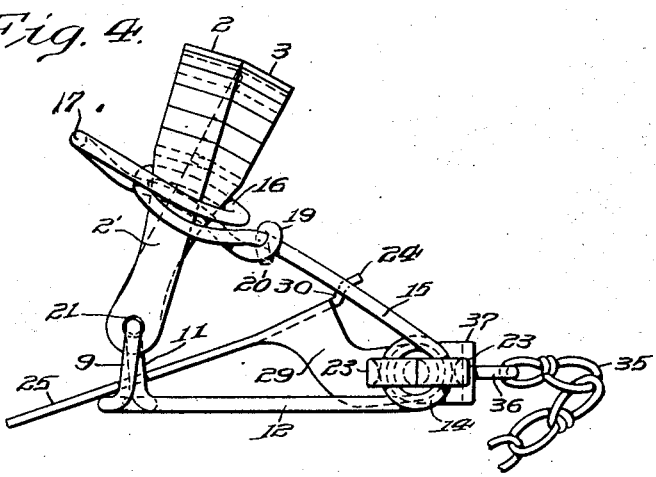
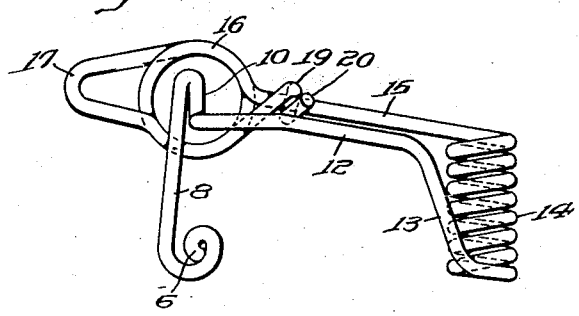
INVENTOR  
*Leopold C. Schneider*
WITNESS
BY
ATTORNEYS Patented Jan. 19, 1926.

1,570,578

UNITED STATES PATENT OFFICE.

LEOPOLD C. SCHNEIDER, OF HATBORO, PENNSYLVANIA.

TRAP.

Application filed December 23, 1921. Serial No. 524,345.

*To all whom it may concern:*

Be it known that I, LEOPOLD C. SCHNEIDER, a citizen of the United States, and a resident of Hatboro, in the county of Montgomery and State of Pennsylvania, have invented certain new and useful Improvements in Traps, of which the following is a specification, reference being had to the accompanying drawings.

A principal object of my invention is to provide an animal trap of the double spring type, that is having springs simultaneously cooperative with both sides of the jaws, which is particularly adapted for economical commercial production in those sizes intended for the trapping of relatively small animals such as muskrats and the like; which comprises a relatively small number of parts and these of extremely simple form and construction and in which the means operative to hold the jaws of the trap in open or set position are directly cooperative with one of the jaws, the dog utilized for this purpose being integral with the pan or pedal thus entirely eliminating the use of the usual overhanging trigger.

A further object of my invention is to provide a trap of the character aforesaid in which the springs, base portions and jaw pivots are made of suitably formed wire and in which both jaws are mounted on the same pivots and revolve about the same axis thereby permitting one jaw to be folded over on the other and secured in convenient position for the transportation of the trap as hereinafter more fully explained.

My invention further contemplates the general simplification of animal traps and the component parts thereof; the arrangement of the various elements so as to minimize the liability of the trap becoming inoperative through freezing or the accumulation of snow or other foreign matter; the provision of a novel form of jaw adapted to afford a maximum holding surface while lending itself to extremely economical manufacture, as well as all of the other various objects and novel features of construction and arrangement hereinafter more definitely specified and described or shown on the accompanying drawing forming a part hereof.

Figure 1:
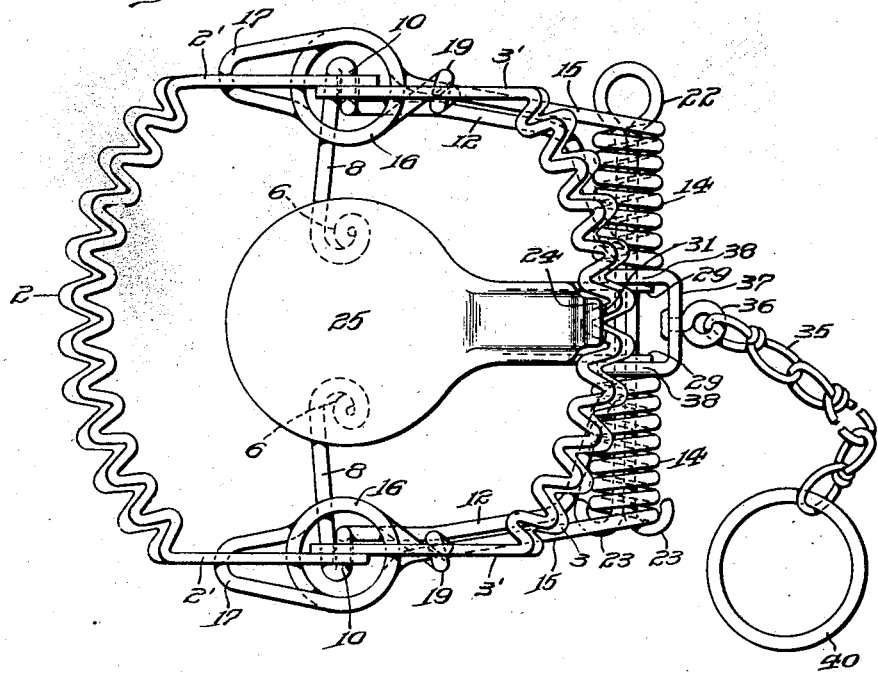
Figure 2:
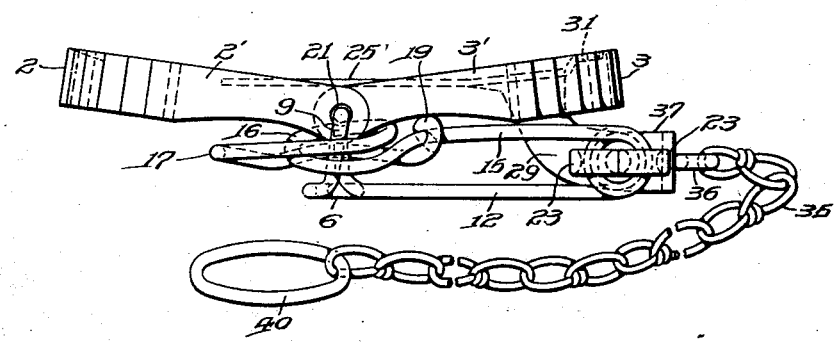

In the said drawings I have illustrated a preferred embodiment of my invention, Fig. 1 being a plan view of the trap in open or set position and Fig. 2 a view thereof in end elevation. Fig. 3 is an end elevation of the trap showing the free jaw folded down upon the other jaw into a convenient position for carrying, the ring at the end of the trap chain being slipped over the jaws and one of the members forming the base of the trap so as to hold the former in place against the compression of the springs irrespective of the position of the detent dog carried by the pan or pedal; Fig. 4 is an end elevation of the trap in sprung position and Fig. 5 is a bottom plan view of one of the springs removed from the trap. Like numerals are used to designate corresponding parts of the several figures.

In the form shown in the drawings the trap comprises a pair of complementary oppositely disposed jaws 2 and 3, the former being hereinafter referred to as the free jaw. While these jaws may be of any desired form, I prefer to make each of them substantially of the shape and in the manner shown, namely, by forming each jaw from a relatively narrow strip of metal of suitable thickness, which is transversely corrugated for a sufficient distance in each direction from its center so that the corrugations extend for substantially the entire length of the holding portion of the jaw. Preferably also the strip is curved downwardly from its center towards each end so that the corrugated portion of the jaw is of substantially arcuate or crescent shape, while the ends of the strip are bent substantially parallel with each other and normal to the chord of the arc to form the sides 2' and 3' of the jaws. One of the jaws, for example the jaw 3, may be made slightly narrower in overall width than the other jaw so that its sides can extend between those of the latter, thus enabling both jaws to be pivoted on the same pivots as hereinafter described, or the jaws may be otherwise suitably arranged for a similar purpose.

In the preferred construction two independent springs are utilized which serve to effect the closure of the jaws, each of these springs as well as the adjacent jaw pivot and base member on which the trap is operatively supported being formed from a single piece of suitable spring wire, the spring, base member and pivot on each side of the trap thus constituting an integral unitary element as best shown in Fig. 5.

As the two elements are identical in all respects save for such differences as are due to their being positioned on opposite sides of the trap, a description of one of them, for example that shown toward the bottom of the sheet in Fig. 1 and in inverted position in Fig. 5, will suffice, it being understood that to facilitate description the element will first be considered as if constructed by itself without regard to the other parts of the completed trap, and when so considered the element may be deemed as formed substantially in the following way: Beginning at the end 6, the wire is coiled on itself for one or more turns and thence directed substantially outwardly as at 8 when viewed as in Fig. 1, thence carried vertically up as at 9 and transversely inward as at 10 to form the pivot for the jaws, thence vertically downward at 11, thence rearwardly as at 12 and angularly inward as at 13. Beyond the end of the part 13, the wire is formed in a suitable outwardly extending coil or spiral 14 of suitable length and from the outer end of the spiral is extended angularly upward as at 15, thence formed in a single coil or loop 16 of sufficient diameter to receive the ends of the jaws when closed, thence directed forwardly of the loop to form a thumb piece 17, thence carried inwardly and rearwardly to pass below the loop and preferably bent so as to substantially follow its contour, and the end of the wire finally twisted about the portion 15 in the rear of the loop as at 19 to terminate at 20.

Obviously, however, the various bends and convolutions just described could not all be made in the wire prior to the assembly of the spring element in connection with the jaws to form the completed trap. Therefore, in practice each spring element is ordinarily constructed by first coiling a length of wire to form the coil 14 after which the loop 16, thumb piece 17 and adjacent parts may be formed at the end of the angularly disposed portion 15 and the various bends made in the other end of the wire as far as the pivot portion 10. The jaws are then passed downwardly through the loop 16, the wire passed through holes 21 formed near the ends of the jaws and thereafter bent downwardly and inwardly and then coiled upon itself to form the several parts, 9, 8 and 6 hitherto described, but if desired, the spring elements may be assembled with the jaws in any other suitable manner effective for the purpose.

In the assembled trap the spring elements are mounted on a suitable support extending longitudinally through the coils 14, and preferably comprising a relatively heavy cotter pin 22, the ends 23 of which are bent over as shown in Fig. 1, after the pin has been passed through the coils, so as to retain them in position upon the pin, but if desired, other forms of supports may be used for the spring elements. I prefer, however, to utilize the cotter pin by reason of its cheapness and the facility with which it may be secured in position.

The supporting member or pin 22 is also utilized to support and form a pivot for the means employed for holding the jaw 3 in open or set position against the compression of the springs when the trap is set, said means conveniently comprising a detent dog 24 formed integral with a pan or pedal 25 and preferably cooperative directly with the jaw 3, the position of the dog being controlled by the position of the pan or pedal on which the animal steps to spring the trap. These parts are movably supported from the pin 22 through the medium of a pair of downwardly and rearwardly extending, laterally spaced ears 29 preferably formed integrally with the pan and dog and having their ends suitably apertured for the passage of the pin 22, the several parts just described being conveniently formed up from a single blank of sheet metal. In order to keep the pan in a relatively low position when the trap is set, I prefer to offset the dog upwardly from the general plane of the pan as at 30 and to insure a suitable and adequate engagement between the dog and the jaw 3, I may form a suitable recess or notch 31 in the upper face of the latter adjacent the point where the dog engages the jaw when the trap is set, the under surface of the dog and the upper surface of the notch being so disposed as to insure the jaw being properly held down by the dog while permitting it to be readily disengaged from the jaw by a slight downward pressure on the pan.

For the purpose of securing the trap to a log, stake or the like, I preferably provide the same with a chain 35 attached to the trap at one end by a swivel 36 carried by and rotatable in a U-shaped member 37 having laterally spaced arms 38 mounted upon and freely rotatable about the pin 22, the member being disposed on the pin between the inner ends of the coils 14 and preferably outside of the ears 29 which are ordinarily spaced apart for a sufficient distance to engage the inner faces of the adjacent arms, the length of the pin 22 being so proportioned with respect to the several parts mounted thereon that when the trap is assembled the said parts will be prevented from substantial longitudinal movement on the pin. The opposite end of the chain may be provided with a ring 40, which in addition to providing means for securing the end of the chain may be used for an additional purpose hereinafter to be described.

It will be apparent that a trap constructed substantially in the manner aforesaid may be set by manually or otherwise depressing the thumb pieces 17 so as to bring the upper parts of the spring elements from their normal angularly disposed position as in Fig. 4, to one substantially parallel with the base portions 12 and 8 thus permitting the jaws to be turned downward and outward to open position and the dog engaged with the jaw 3 to hold it open, the several parts being then in the position shown in Fig. 2. When the trap is sprung by depression of the pedal 25, the energy stored up in the coils 14 during the setting operation is suddenly released, thereby moving the loops 16 rapidly upward over the sides of the jaws and causing the latter to move toward each other until the centers or corrugated portions of the jaws contact either with each other or with the leg of an animal or other object interposed between them, and as the size of the loops 16 is preferably such that when the jaws are closed or nearly closed, the loops will contact with the edges of the jaws and extend substantially at right angles to the general direction in which the sides of the jaws extend, it is very difficult, if not impossible, to thereafter open the jaws by pulling or prying them apart without a simultaneous depression of the loops, thereby substantially eliminating the chance of an animal caught in the trap from releasing itself therefrom.

It will be observed that in the trap when assembled the spring coils 14 are disposed substantially parallel to the jaw pivots as well as to a plane passing through the pivots and line of contact of the jaws when in closed position, while being entirely out of the way of the pan and dog and in such position as to negative any possibility of interference with the action of the animal in placing his foot on the pan or with the closing of the jaws when the trap is sprung. Moreover the portions 8 and 12 of the spring elements in effect form a base on which the trap is adapted to rest in a substantially horizontal position and that as the ends of the former are preferably directed inwardly sufficiently far to terminate beneath the pan, the movement of the latter about the pivot pin is limited by engagement with subjacent ends of the spring elements, so that when the trap is in sprung position the pan is prevented from swinging below the plane of the base of the trap to a position where it might be bent or otherwise injured.

A feature of considerable advantage in a trap constructed in accordance with my invention resides in the fact by reason of both jaws being mounted on the same pivots, it is possible to fold the free jaw down upon the other jaw when the later is in set position and to secure the jaws in place against compression with the springs by passing the ring 40 over the pivoted ends at one side of the jaws and up along the latter until further movement of the ring is blocked by its engagement with the edge of the uppermost jaw and with the subjacent portion 12 of the spring element, as shown in Fig. 3. With the ring in such position the jaws are prevented from rising irrespective of whether the dog 24 is in engagement with the jaw 3, so that in this manner the trap may be set in any desired place, the free jaw folded down, the ring slipped into position and the trap then safely and conveniently transported to the place where it is desired to use it, after which the ring may be disengaged from the jaws and the free jaw folded back to open position thus making the trap immediately available for operation.

A further advantage of my invention resides in the preferred use of the corrugated jaws which afford a maximum engaging surface for contact with the foot or leg of an animal as well as a plurality of cavities or indentations into which the foot or leg of an animal caught in the trap rapidly swells, thus enhancing the holding power of the trap and preventing the animal from pulling his foot from between the jaws.

It will thus be observed I have provided an animal trap of extremely simple and compact construction which comprises a minimum number of parts and these of such nature that they readily lend themselves to economical manufacture and assembly, thus enabling the trap to be manufactured and marketed at a relatively low cost. Additionally the arrangement of the several parts is such that the jaws come together very rapidly when the trap is sprung, while the holding power of the trap, by reason of the utilization of springs operative on both sides of the jaws and so disposed as to substantially lock the jaws in closed or nearly closed position, is relatively very great in a trap of the given size, a feature which may be enhanced by the employment of the preferred form of jaw herein described.

While I have shown in the accompanying drawings and described with a considerable degree of particularity a preferred embodiment of my invention, I do not thereby desire or intend to limit myself to any precise details of construction, arrangement of parts or method of assembly as the same may, if desired, be readily varied or modified from those herein shown and described without departing from the spirit and scope of the invention as defined in the appended claims.

Having thus described my invention, I claim and desire to protect by Letters Patent of the United States:

1. In an animal trap, the combination of a pair of cooperative jaws and a pair of independent spring elements, each of said elements being formed to provide, unitarily a spring coil, a loop adapted to surround and cooperate with the sides of the jaws, a pivot for the jaws and means for supporting the trap; and means extending longitudinally through the coils operative to maintain the coils in assembled position in the trap.

2. In an animal trap, the combination of a pair of cooperative jaws and a pair of spring elements, each of said elements being formed of spring wire and comprising a spring coil, a loop adapted to encircle the adjacent sides of the jaws, a pivot extending through the jaws and means forming a support or base for the trap, a pivot pin extending longitudinally through both coils, and a pedal supported on and revoluble about said pin.

3. An animal trap comprising a pair of cooperative jaws and a pair of spring elements, each of said elements being formed of spring wire and comprising a spring coil, a loop adapted to cooperably encircle the adjacent sides of the jaws, a pivot extending through the jaws and means forming a support or base for the trap, a pivot pin extending longitudinally through both coils, and a pedal comprising a dog cooperative with one of said jaws, supported on said pin between said coils and movable thereabout.

4. An animal trap comprising a pair of cooperative jaws and a pair of independent spring elements, each of said elements being formed of spring wire bent to provide a spring coil and extended from one end of the coil to cooperably encircle the adjacent sides of the jaws and extended from the other end of the coil to form a base for the trap and a pivot for the jaws, a supporting pin extending through both of said coils, and a pedal movably supported on said pin between the coils and having a dog cooperative with one of said jaws to releasably hold the same in set position against the tension of said coils.

5. In an animal trap, the combination of a pair of cooperative jaws and a pair of spring elements each formed of spring wire and comprising a coil, a loop adjacent one end thereof adapted to encircle the adjacent sides of the jaws and a portion connected with the other end of the coil and forming a pivot for the jaws, and means for supporting both coils, said loops being so disposed as to extend substantially normal to the general direction of the sides of the jaws when the latter are in closed position.

6. In an animal trap, the combination of a pair of cooperative jaws and a pair of spring elements each formed of spring wire and comprising a coil, a portion normally extending angularly outward from one end of the coil and formed to provide a loop adapted to encircle the adjacent sides of the jaws when the latter are in closed position and a portion extending from the other end of the coil and comprising a pivot for the jaws, a supporting pin extending through both coils and a pedal rotatably mounted on the pin.

7. An animal trap comprising a pair of cooperative jaws and a pair of independent spring elements each formed of spring wire and comprising a horizontally disposed coil, a portion normally extending angularly upward from one end of the coil and having a loop adapted to encircle the adjacent sides of the jaws when the latter are in closed position and a portion extending from the other end of the coil and bent to form a pivot for the jaws and supporting means for the trap, a supporting pin extending through both coils, a pedal comprising a dog cooperative with one of the jaws and rotatably mounted on said pin, and a member also mounted on the pin forming a point of attachment for the trap chain.

8. In an animal trap, the combination of a pair of cooperative jaws and a pair of spring elements each bent to provide a coil, means cooperative with the jaws to move the same to closed position when the trap is sprung and a pivot for the adjacent sides of the jaws, a supporting pin extending through the coils, a member mounted on said pin and providing a support for one end of the trap chain, and a ring at the other end of the chain, said jaws being adapted to be turned down on each other so as to compress said spring and to be maintained in such position by engaging said ring over the pivoted ends of the jaws.

9. A jaw for an animal trap formed from a strip of metal of greater width than thickness bent upon itself in the direction of its least dimension to form corrugations extending generally transversely of the strip whereby the ends of the corrugations form the gripping face of the jaw.

10. A jaw for an animal trap formed from a flat strip of metal of greater width than thickness and having a central portion provided with corrugations extending thereacross generally transversely of the least dimension of the strip and end portions in substantially parallel relation with each other, the gripping face of the jaw being formed by the ends of the corrugations.

11. A jaw for an animal trap formed from a flat relatively thin strip of metal and having a central portion provided with a plurality of adjacent corrugations extending across the strip, the edge of the strip adjacent said corrugations forming the gripping face of the jaw and end portions extending in substantially parallel spaced ralation and forming the sides of the jaw.

12. In an animal trap, the combination of a pair of cooperative jaws and a pair of independent spring elements each formed to unitarily provide a spring coil, a loop adapted to cooperate with the sides of the jaws, and a pivot for the jaws, the central axis of the coil being disposed in substantially parallel relation with the axis of the pivot.

13. In an animal trap, the combination of a pair of cooperative jaws and a pair of spring elements, each of said elements being formed to unitarily provide a spring coil, a loop adapted to cooperate with the sides of the jaws, and a pivot for the jaws, said coils in the assembled trap being disposed with their longitudinal axes in substantially parallel relation to the axes of the pivots of the jaws.

14. In an animal trap, the combination of a pair of cooperative jaws and a pair of spring elements, each of said elements being formed to unitarily provide a spring coil, a loop adapted to cooperate with the sides of the jaws, and a pivot for the jaws, said elements in the assembled trap being so disposed that the coils thereof are in axial relation and substantially parallel to a plane passing through the pivots and the line of contact of the jaws when in closed position.

In witness whereof, I have hereunto set my hand this 22nd day of December, 1921.

LEOPOLD C. SCHNEIDER.